US010096960B2

(12) United States Patent
Kato et al.

(10) Patent No.: US 10,096,960 B2
(45) Date of Patent: Oct. 9, 2018

(54) BRUSH HOLDER ASSEMBLY AND COMMUTATOR MOTOR COMPRISING SAID BRUSH HOLDER ASSEMBLY

(71) Applicant: Panasonic Intellectual Property Management Co., Ltd., Osaka (JP)

(72) Inventors: Masato Kato, Osaka (JP); Kazuo Toya, Osaka (JP); Syouzou Sakon, Osaka (JP); Yasuharu Uchida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 129 days.

(21) Appl. No.: 14/907,257

(22) PCT Filed: Jul. 31, 2014

(86) PCT No.: PCT/JP2014/004021
§ 371 (c)(1),
(2) Date: Jan. 22, 2016

(87) PCT Pub. No.: WO2015/019587
PCT Pub. Date: Feb. 12, 2015

(65) Prior Publication Data
US 2016/0164237 A1 Jun. 9, 2016

(30) Foreign Application Priority Data

Aug. 5, 2013 (JP) .................................. 2013-162094

(51) Int. Cl.
*H01R 39/39* (2006.01)
*H02K 5/14* (2006.01)
(Continued)

(52) U.S. Cl.
CPC ........... *H01R 39/39* (2013.01); *H01R 39/385* (2013.01); *H01R 39/388* (2013.01); *H02K 5/148* (2013.01); *H02K 13/006* (2013.01)

(58) Field of Classification Search
CPC .... H01R 39/385; H01R 39/388; H01R 39/39; H02K 13/006; H02K 5/148
(Continued)

(56) References Cited

U.S. PATENT DOCUMENTS 3,617,786 A 11/1971 Stielper
4,340,831 A 7/1982 Kuhlmann et al.
(Continued)

FOREIGN PATENT DOCUMENTS

EP 1193831 4/2002
JP 63-058865 U 4/1988
(Continued)

OTHER PUBLICATIONS

The Extended European Search Report dated Jun. 17, 2016 for the related European Patent Application No. 14834775.0, dated Jun. 17, 2016, 10 pages.
(Continued)

*Primary Examiner* — Alex W Mok
(74) *Attorney, Agent, or Firm* — Hamre, Schumann, Mueller & Larson, P.C.

(57) ABSTRACT

This brush holder assembly includes: a brush holder formed in a disk shape by molding of insulating resin, and including a pair of box fixing sections each including a groove formed from an outer peripheral side toward inside: and brush box assemblies each having a brush box which houses a brush therein, each of the brush box assemblies being disposed in the box fixing section. Each of the brush box assemblies is formed of box-like metal, and has a plurality of mounting legs. Additionally, each of the box fixing sections of the brush holder has a plurality of mounting holes. In this brush holder assembly, these mounting legs are inserted into the respective mounting holes, and the brush box assembly is fixed. Furthermore, in the brush holder assembly of the
(Continued)

present invention, the brush holder assemblies face the brush holder through gaps. Additionally, a commutator motor of the present invention includes the above brush holder assembly.

6 Claims, 6 Drawing Sheets

(51) Int. Cl.
  *H02K 13/00* (2006.01)
  *H01R 39/38* (2006.01)
(58) Field of Classification Search
  USPC .......................................................... 310/43
  See application file for complete search history.

(56) References Cited

U.S. PATENT DOCUMENTS

| | | | | |
|---|---|---|---|---|
| 7,414,346 B1* | 8/2008 | Henmi | ................... | H01R 39/36 310/239 |
| 2008/0164781 A1* | 7/2008 | Taguchi | ................. | H02K 5/148 310/227 |
| 2009/0066185 A1* | 3/2009 | Kurasawa | .............. | H01R 39/40 310/239 |
| 2010/0109492 A1* | 5/2010 | Yamauchi | .............. | H02K 5/148 310/68 R |
| 2010/0277032 A1* | 11/2010 | De Filippis | ............ | H01R 39/46 310/227 |

FOREIGN PATENT DOCUMENTS

| | | |
|---|---|---|
| JP | 2002-136032 | 5/2002 |
| JP | 2002-136062 | 5/2002 |
| JP | 2003-079107 | 3/2003 |
| JP | 2005-073317 | 3/2005 |
| WO | 2006/021573 | 3/2006 |

OTHER PUBLICATIONS

International Search Report of PCT application No. PCT/JP2014/004021 dated Nov. 4, 2014.

* cited by examiner

BRUSH HOLDER ASSEMBLY AND COMMUTATOR MOTOR COMPRISING SAID BRUSH HOLDER ASSEMBLY

CROSS-REFERENCE TO RELATED APPLICATIONS

This application is a U.S. national stage application of the PCT International Application No. PCT/JP2014/004021 filed on Jul. 31, 2014, which claims the benefit of foreign priority of Japanese patent application 2013-162094 filed on Aug. 5, 2013, the contents all of which are incorporated herein by reference.

TECHNICAL FIELD

The present invention relates to a brush holder assembly of a commutator motor with a brush for a vehicle or the like, and a commutator motor comprising said brush holder assembly.

BACKGROUND ART

Recently, in a commutator motor with a brush used for a vehicle, while reduction in weight, reduction in thickness, improvement in efficiency, increase in life, improvement in reliability, and reduction in cost have been progressing, similar requirements for motors from a low-output motor to a high-output motor are made. In a conventional technology, as specifications to cover surrounding of a commutator motor with a brush, a method for inserting a brush assembly into an insulating resin bracket provided with a brush sliding groove (for example, refer to PTL 1), or a motor in which metal cover plate 47 is pressed into an insulating resin brush holder, or a motor using a metal box integral type is known.

In the conventional technology, specifications in which metal cover plate 47 is pressed into the insulating resin brush holder has a problem in a heat-resisting property of the insulating resin brush holder. That is, there is a problem, that a resin wall of the brush holder exceeds a heat resistant temperature of the resin due to heat generated by a brush of a high-output motor, and the brush and the resin wall of the brush holder are fixed to each other to reach non conduction, for example.

Additionally, in the method using the metal box integral type, the metal box is directly mounted on a flat brush holder in order to fix the metal box, and therefore a part, to which the insulating resin brush holder is fixed, needs to be located at a high position.

CITATION LIST

Patent Literature

PTL 1: Unexamined Japanese Utility Model Publication No. S63-58865

SUMMARY OF THE INVENTION

A brush holder assembly of the present invention includes: a brush holder formed in a disk shape by molding of insulating resin, and including a pair of box fixing sections each including a groove formed from an outer peripheral side toward inside: and brush box assemblies each having a brush box which houses a brush therein, each of the brush box assemblies being disposed in the box fixing section. Each of the brush box assemblies is formed of box-like metal, and has a plurality of mounting legs. Additionally, each of the box fixing sections of the brush holder has a plurality of mounting holes. In this brush holder assembly, these mounting legs are inserted into the respective mounting holes, and the brush box assemblies are fixed.

Furthermore, in the brush holder assembly of the present invention, the brush box assemblies face the brush holder through gaps.

Additionally, a commutator motor of the present invention includes the above brush holder assembly.

Thus, a slight space is provided between the brush holder and the brush box assemblies, and the brush holder and the brush box assemblies are brought into noncontact state with each other, thereby forming a heat insulating layer for allowing heat of the brush reaching a high temperature to be unlikely to transfer to the resin section. Then, the resin sections around the brush box assemblies can be protected from a high temperature state by the formed heat insulating layer. Furthermore, the brush and the resin wall of the brush holder can be prevented from being fixed to each other. Additionally, it is possible to improve heat radiation to the brush that reaches a high temperature.

Additionally, a commutator motor of the present invention includes the above brush holder assembly.

Thus, in the brush holder assembly and the commutator motor of the present invention, the brush box assemblies and the brush holder of insulating resin are designed to have a gap therebetween, and are brought into noncontact with each other. This leads to heat radiation promotion, suppression of rise in temperatures of the brush holder and the brushes. Furthermore, the metal brush box assemblies are used, and therefore heat expansion is small, and clearances between the brush box assemblies and the brushes can be designed to be small compared to a conventional resin brush holder formed. Therefore, reduction in sound and vibration is effective. Additionally, heat radiation is promoted by metal brush box specifications, and therefore reduction in cost can be attained by degradation in a grade of the insulating resin brush holder (using of resin having low heat-resisting property).

DESCRIPTION OF EMBODIMENT

Hereinafter, a commutator motor comprising a brush holder assembly according to an exemplary embodiment of the present invention is described with reference to the drawings.

Exemplary Embodiment

First, an overview of a commutator motor comprising a brush holder assembly according to an exemplary embodiment of the present invention is described.

Figure 1:
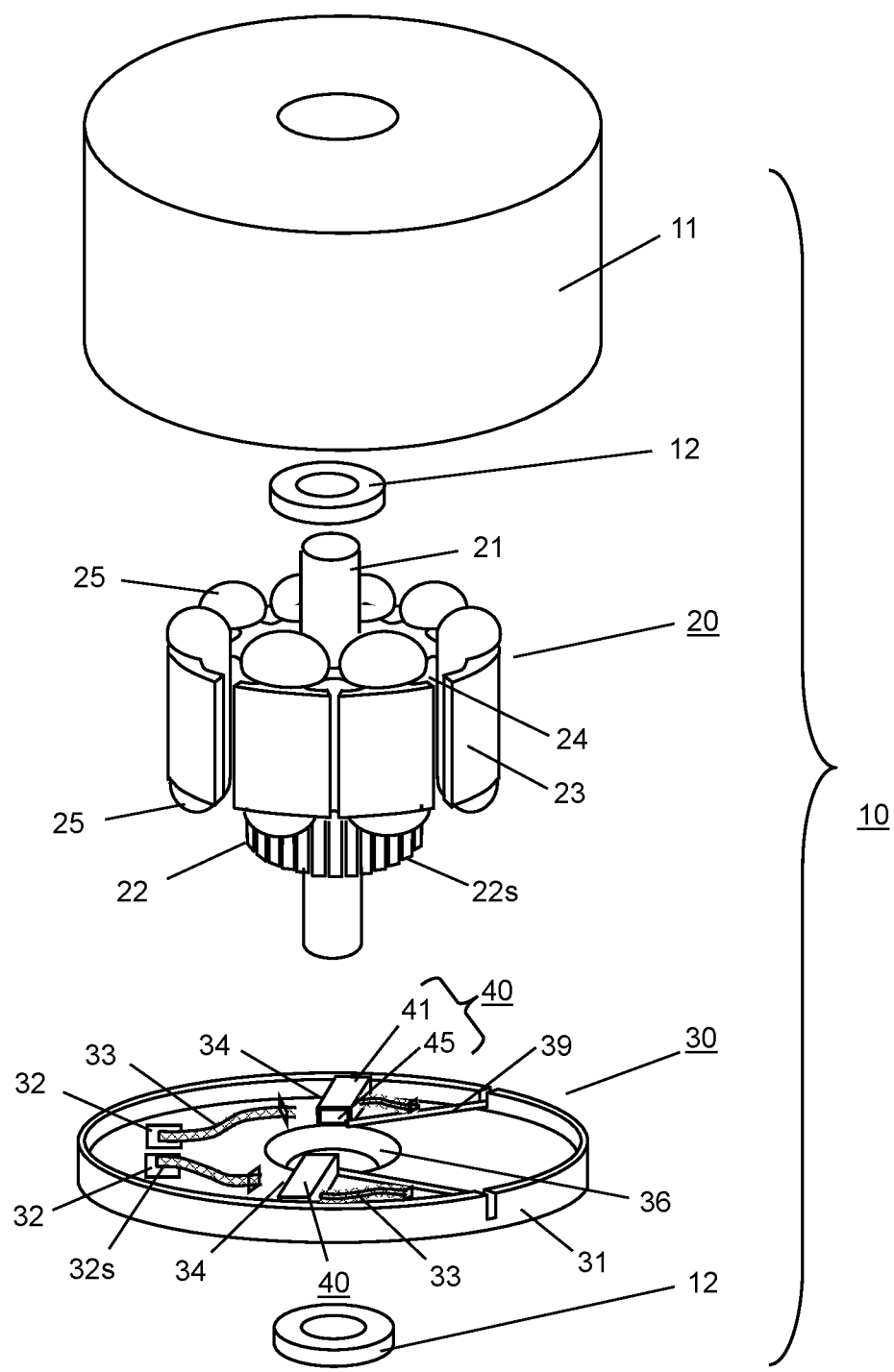
FIG. 1 is a perspective assembly diagram of a commutator motor comprising a brush holder assembly according to an exemplary embodiment of the present invention.

FIG. 1 is a perspective assembly diagram of commutator motor 10 including brush holder assembly 30 according to the exemplary embodiment of the present invention.

As illustrated in FIG. 1, commutator motor 10 includes cylindrical hollow frame 11 having an open end, rotor 20 housed in frame 11, and brush holder assembly 30 mounted so as to cover an opening of the frame 11. Then, rotor 20 is rotatably supported by a pair of bearings 12 disposed at both ends. Additionally, a magnet (not illustrated) is mounted on an inner peripheral surface of frame 11, and bearings 12 pressed into and fixed to a bearing holder (not illustrated) located at a bottom surface of frame 11 are mounted.

On an inner peripheral side of this frame 11, rotor 20 is disposed. Rotor 20 includes rotary shaft 21, commutator 22, armature core 23, and windings 25. Armature core 23 is formed of laminated steel sheets, iron or the like, and has a plurality of slots 24. Windings 25 are wounded and housed in slots 24. Then, rotary shaft 21 axially penetrates a center of armature core 23 to be fixed. Additionally, cylindrical commutator 22 is fixed to rotary shaft 21. Commutator 22 has a plurality of segments 22s being metal pieces, on a cylindrical surface, and terminals of windings 25 are electrically connected to these segments 22s.

Additionally, brush holder assembly 30 includes brush holder 31, power terminal sections 32, electric wires 33, and a pair of brush box assemblies 40.

Insulating resin is molded in a disk shape, so that brush holder 31 is formed. Furthermore, brush holder 31 is formed with box fixing sections 34 for disposing brush box assemblies 40, power terminal sections 32 for supplying power from outside, bearing holder 36 for holding bearing 12 pressed into and fixed to an end of rotary shaft 21, and the like. In box fixing sections 34, brush box assemblies 40 housing brushes 41 are mounted. Herein, each brush box assembly 40 is configured such that brush 41 and brush spring 42 are housed in brush box 45, as illustrated also in FIG. 2. Furthermore, in order to supply power to brushes 41, power terminals 32s of power terminal sections 32 and brushes 41 are electrically connected by electric wires 33.

Brush holder assembly 30 is mounted in the opening of frame 11 such that both bearings 12 rotatably support rotary shaft 21, so that commutator motor 10 is configured. With such a configuration, respective brushes 41 of brush box assemblies 40 disposed in brush holder assembly 30 are disposed in contact with commutator 22 while being pressed against commutator 22. In order to improve efficiency of an assembly process, brush holder assembly 30 is provided with holding members 39 for suppressing protrusion of brushes 41 during assembling. Holding members 39 are, for example, elongated pins.

With the above configuration, electric connection from power terminals 32a to windings 25 through electric wires 33, brushes 41, and segments 22s of commutator 22. That is, a power supply voltage is supplied to power terminals 32s, so that a driving current flows from brushes 41 to windings 25 through commutator 22. Then, magnetism is generated in armature core 23 by this driving current, rotational force is generated between armature core 23 and the magnet in frame 11 which is a stator, and rotor 20 rotates.

Figure 2:
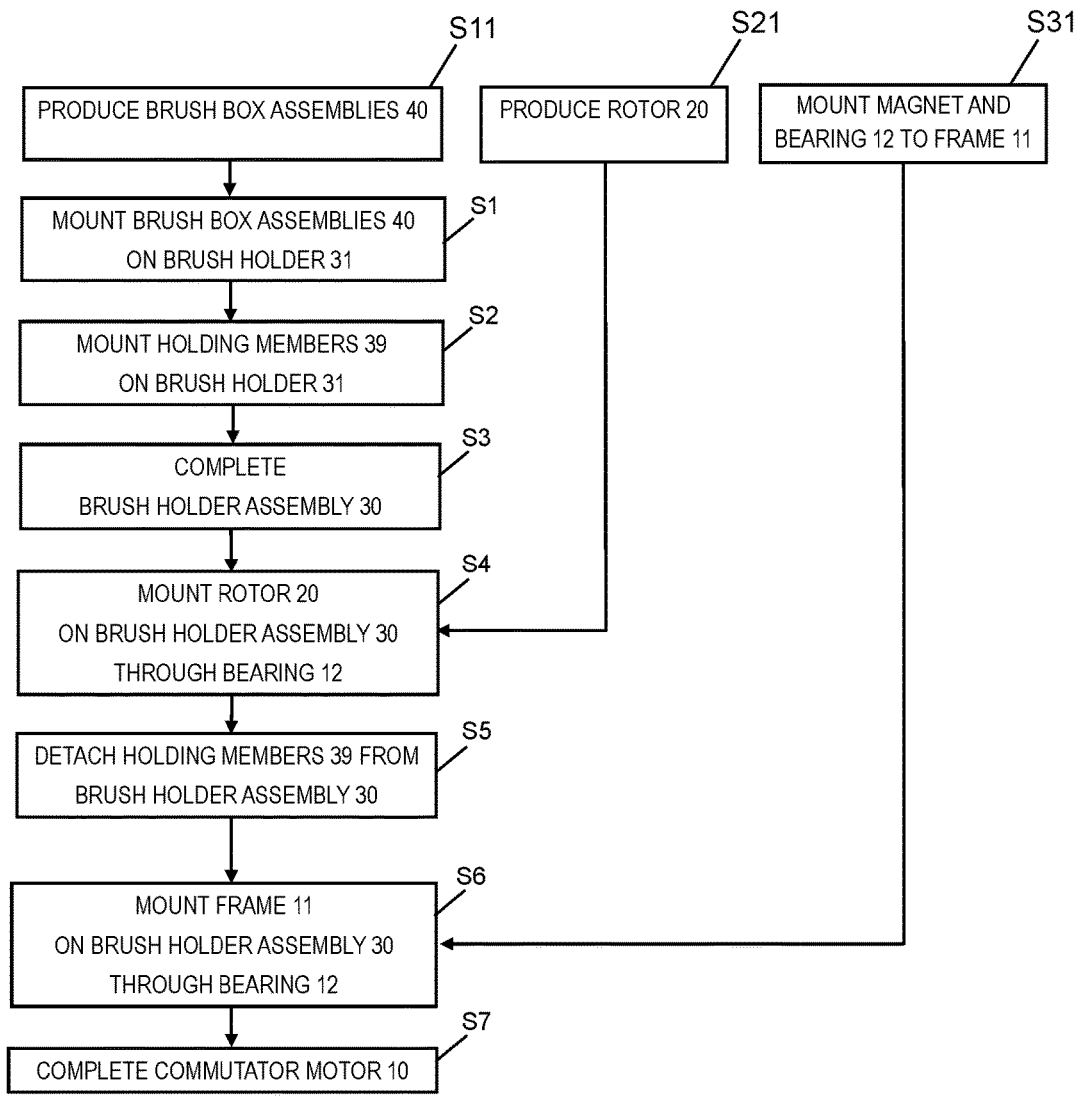
FIG. 2 is a flowchart illustrating a manufacturing flow of the commutator motor comprising the brush holder assembly.

Now, a method for manufacturing commutator motor 10 is described with reference to FIG. 2. FIG. 2 is a flowchart illustrating a manufacturing flow of commutator motor 10.

First, brush box assemblies 40 that house brushes 41 along with brush springs 42 are produced in brush boxes 45 that are substantially metal boxes (S11). Produced brush box assemblies 40 are mounted on box fixing sections 34 formed in brush holder 31 (S1). Next, holding members 39 are mounted on brush holder 31 mounted with brush box assemblies 40 so as to suppress protrusion of brushes 41 (S2). Furthermore, mounting of electric components, and wiring are performed, so that brush holder assembly 30 is completed (S3).

Rotor 20 is produced in another assembly process (S21). An end of rotary shaft 21 is made to pass through hole 37 for a rotary shaft of brush holder assembly 30, bearing 12 is pressed into and fixed to this end of rotary shaft 21, and this bearing 12 is held by bearing holder 36, so that rotor 20 is mounted on brush holder assembly 30 (S4). At this time, brushes 41 are held in brush box assemblies 40 by holding members 39. Accordingly, rotor 20 is mounted on brush holder assembly 30 by single work such that commutator 22 provided in rotor 20 is located at such a place as to face opening sections of brush box assemblies 40. Thus, rotor 20 is installed on brush holder assembly 30 so as to be located at the place where commutator 22 provided in rotor 20 faces the opening sections of brush box assemblies 40, that is, located at a predetermined position.

When rotor 20 is installed at the predetermined position, holding members 39 are detached from brush holder assembly 30 (S5). As a result, brushes 41 come into contact with commutator 22 by urging force of brush springs 42.

Additionally, bearings 12 and the magnet (not illustrated) are mounted inside frame 11 in another assembly process (S31). In this state, frame 11 is mounted on brush holder assembly 30 (S6). By work of such a flow, commutator motor 10 according to this exemplary embodiment is produced (S7).

Now, a detailed configuration of brush holder assembly 30 according to the exemplary embodiment of the present invention is described.

Figure 3:
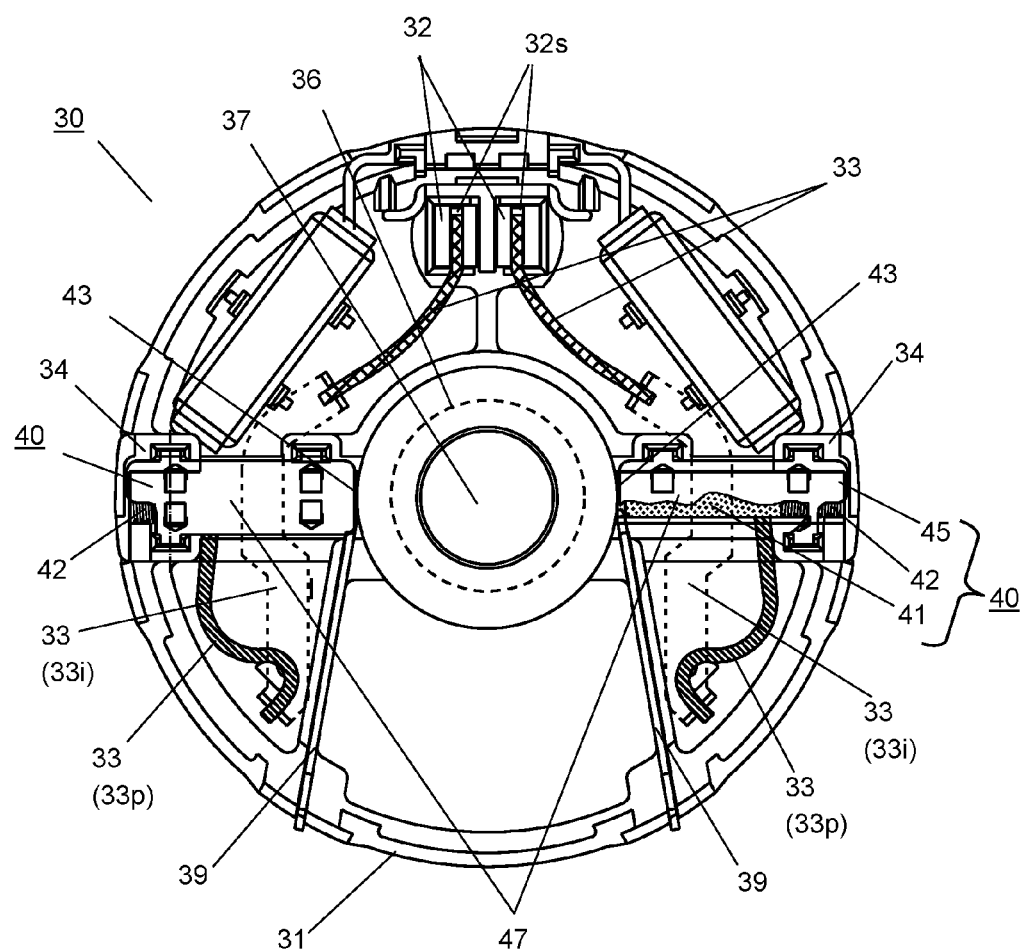
FIG. 3 is a configuration diagram of the brush holder assembly.

FIG. 3 is a configuration diagram of brush holder assembly 30 according to the exemplary embodiment of the present invention. As illustrated in FIG. 3, various components such as brush box assemblies 40 are mounted on brush holder 31, so that brush holder assembly 30 is configured.

First, brush holder 31 is formed with a pair of box fixing sections 34 from an outer peripheral side to inside. In box fixing sections 34, respective brush box assemblies 40 are disposed. In FIG. 3, one (right in the drawing) of brush box assemblies 40 is illustrated in a state where a part of cover plate 47 is cut out, illustrated also in FIG. 6, and the other (left in the drawing) is illustrated in a state where cover plate 47 covers. As illustrated in FIG. 3, brushes 41 and brush springs 42 are housed in brush boxes 45, so that brush box assemblies 40 are configured. Additionally, brush box assemblies 40 have opening sections 43 on an inner peripheral side that is a position where each brush box assembly 40 faces commutator 22. Brush box assemblies 40 are disposed along a radial direction of rotor 20 orthogonal to rotary shaft 21 so as to face rotor 20. Then, brushes 41 housed in brush box assemblies 40 are movable along the radial direction. Brushes 41 slide in contact with commutator 22 through opening sections 43. Brushes 41 are each formed in a rectangular parallelopiped shape.

Additionally, brush springs 42 that are elastic members are also disposed inside brush box assemblies 40. Brush springs 42 are disposed inside brush boxes 45 so as to press brushes 41 against commutator 22 along the radial direction.

The elastic members may be other members, as long as the members have suitable elastic force when brushes 41 are pressed.

Figure 4:
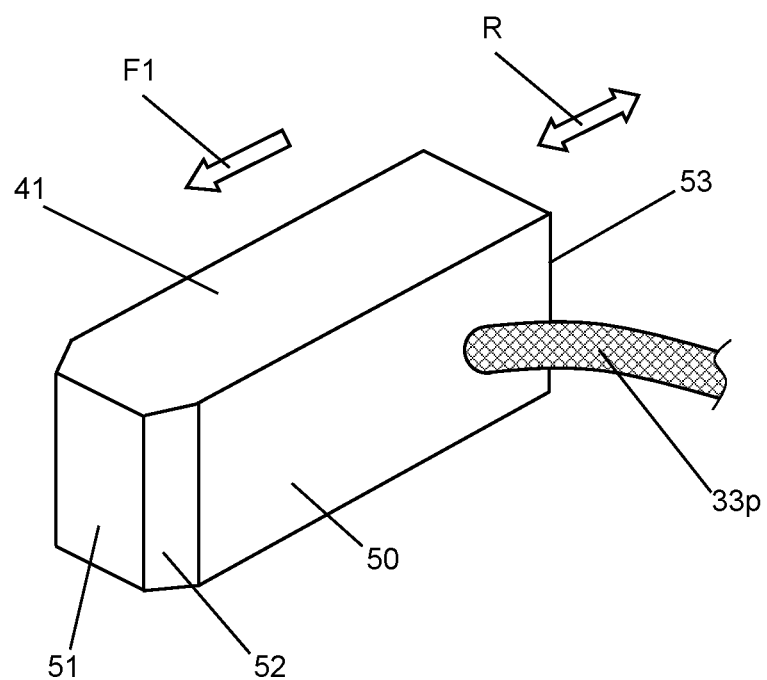
FIG. 4 is a perspective view of a brush according to the brush holder assembly.

FIG. 4 is a perspective view of brush 41 according to the exemplary embodiment of the present invention. Each brush 41 has side surface 50 provided along radial direction R, sliding surface 51 that slides in contact with commutator 22, and back surface 53 that receives the elastic force of brush springs 42. Brush 41 has chamfered sections 52 formed by chamfering of surroundings of sliding surface 51. Brush 41 is pressed in direction F1 by brush springs 42.

As illustrated in FIG. 4, brush 41 has pigtail 33p on side surface 50. Pigtail 33p is an electric wire bundled by, for example, knitting of a copper line, and has flexibility. Pigtail 33p connected to brush 41 configures a part of electric wire 33 that supplies a driving current to brush 41.

Additionally, brush holder 31 is formed with power terminal sections 32 for supplying power from outside. Positive and negative drive voltages are applied to power terminals 32a of power terminal sections 32 from outside of commutator motor 10. When a drive voltage is applied to power terminals 32a, a driving current flows in windings 25 as described above. In the configuration of this exemplary embodiment illustrated in FIG. 3, a driving current is guided through pigtail 33p to one of brushes 41 via one of electric wires 33 connected to power terminal 32a on a positive side, inner electric wire 33i provided inside resin of brush holder 31. The driving current is supplied to commutator 22 through brush 41 pressed to commutator 22 by brush springs 42. Furthermore, the driving current that flows into another brush 41 via commutator 22 is guided to power terminal 32s on a negative side through another pigtail 33p, inner electric wire 33i, and electric wire 33.

Now, details of brush box assemblies 40 and box fixing sections 34 on which brush box assemblies 40 are mounted are described.

Figure 5:
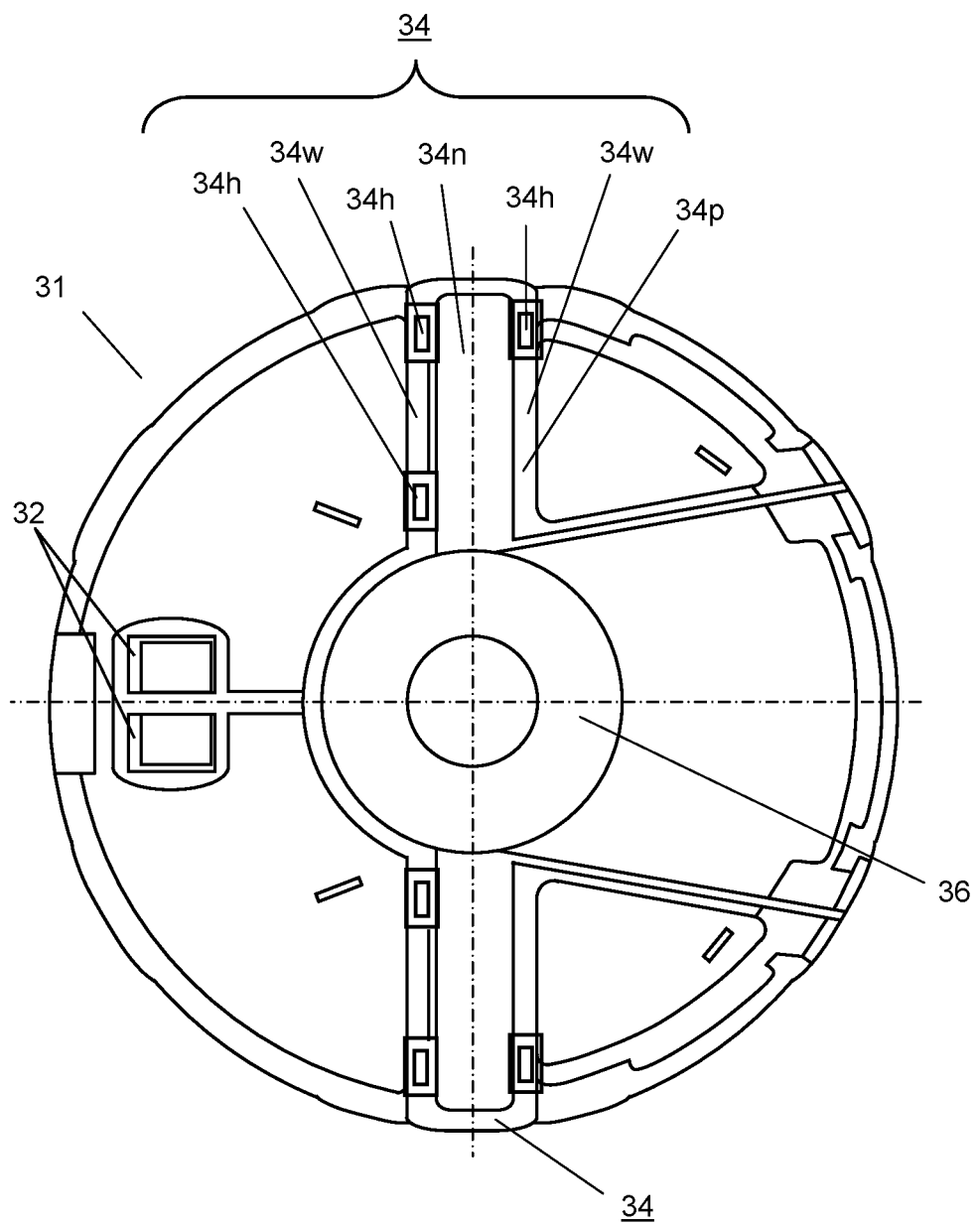
FIG. 5 is a configuration diagram of the brush holder according to the brush holder assembly.

FIG. 5 is a configuration diagram of brush holder 31 according to the exemplary embodiment of the present invention. As described above, in brush holder 31, box fixing sections 34 for disposing brush box assemblies 40, power terminal sections 32, bearing holder 36 for holding bearings 12, and the like are formed by resin molding.

As illustrated in FIG. 5, box fixing sections 34 each include a pair of fixing wall sections 34w facing each other, groove 34n that is a groove formed from the outer peripheral side to the inside so as to be sandwiched between fixing wall sections 34w, and a plurality of mounting holes 34h. A pair of box fixing sections 34 is formed on brush holder 31. Brush box assemblies 40 are mounted on brush holder 31 so as to be disposed in grooves 34n, by utilization of mounting holes 34h. In order to dispose brush box assemblies 40 in grooves 34n, brush boxes 45 are formed of box-like metal roughly smaller than grooves 34n. Additionally, in order to pull out each pigtail 33p, on a side surface of one of fixing wall sections 34w of each box fixing section 34, passage groove 34p of pigtail 33p of brush 41 is formed.

Figure 6:
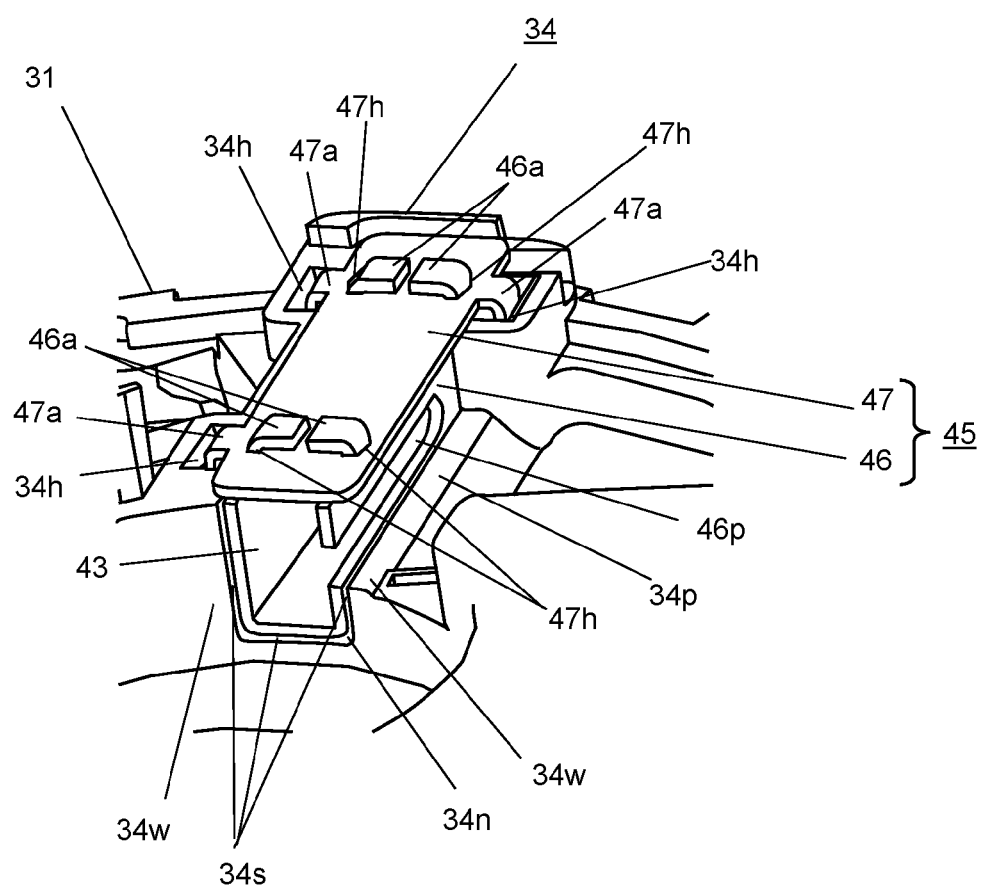
FIG. 6 is a diagram illustrating a state where a brush box is mounted on a box fixing section in the brush holder assembly.

FIG. 6 is a diagram illustrating a state where brush box 45 is mounted on box fixing section 34 according to the exemplary embodiment of the present invention. Although FIG. 6 illustrates a state where brush 41 and the like are not housed in brush box 45 in order to avoid complication, brush box assemblies 40 housing brushes 41 and the like are actually mounted in the state of FIG. 6.

As illustrated in FIG. 6, each groove 34n capable of housing brush box 45 is provided in brush holder 31 molded by insulating resin, and brush box 45 formed by metal is disposed in each groove 34n. Furthermore, gap section 34s which is a slight space is provided between brush holder 31 and brush boxes 45, and brush holder 31 and brush boxes 45 are brought into noncontact state with each other.

As illustrated in FIG. 6, brush box 45 includes brush case 46 that has a U-shaped cross-section for housing brush 41, and cover plate 47 that covers an upper part of brush case 46.

Brush case 46 is configured by three faces including a bottom surface section, and respective side surface sections extending from both ends of the bottom surface section in a substantially vertical direction. These three faces of brush case 46 become a sliding section of brush 41. More specifically, brush case 46 is formed with mounting claws 46a on tip end lines of side surface sections. FIG. 6 illustrates an example in which two mounting claws 46a are provided on each side surface section. Furthermore, in one of the side surface sections of brush case 46, pigtail hole 46p that is a hole for drawing out pigtail 33p is formed.

Cover plate 47 is a sheet of metal plate. More specifically, a plurality of mounting holes 47h are formed such that positions and sizes are matched with positions and sizes of respective mounting claws 46a of brush case 46. Furthermore, cover plate 47 is formed with a plurality of mounting legs 47a protruding from both ends. FIG. 6 illustrates an example in which two mounting legs 47a are provided on one side, and one mounting leg 47a is formed on the other side.

Two or more mounting claws 46a of metal brush case 46 are inserted into two or more mounting holes 47h of cover plate 47 made of metal, and bent to be fixed, namely caulked, so that brush box 45 is formed. Consequently, cover plate 47 is disposed on one side surface that becomes a longitudinal opening face of brush case 46, and covers groove 34h of box fixing sections 34. Thus, brush box 45 obtained by integration of brush case 46 with cover plate 47 is formed. In this exemplary embodiment, thus, brush box 45 is formed by fixing of metal brush case 46 to metal cover plate 47, so that surroundings of brushes 41 can be covered by metal. Therefore, brush 41 and a resin wall of brush holder 31 can be prevented from being fixed by heat of brush 41 that reaches a high temperature.

In order to house brush box 45 in groove 34n of brush holder 31, a plurality of mounting legs 47a are formed in cover plate 47. On the other hand, in brush holder 31, mounting holes 34h are formed such that positions and sizes are matched with positions and sizes of mounting legs 47a. Then, mounting legs 47a of metal cover plate 47 are pressed into mounting holes 34h formed in brush holder 31, so that brush boxes 45 are mounted on box fixing sections 34 of brush holder 31.

In this exemplary embodiment, at this time, each brush box 45 is assembled so as not to come into contact with the resin wall of brush holder 31. That is, when respective mounting legs 47a of cover plate 47 are pressed into mounting holes 34h, gap sections 34s are provided such that gaps can be formed between the bottom surface section of brush box 45 and groove 34n, and between the side surface sections and fixing wall sections 34w in a noncontact manner. In this exemplary embodiment, thus, location of each brush box assembly 40 is designed to have gaps, and therefore brush box assembly 40 housing brush 41 does not deform, sliding of brush 41 is not hindered due to deformation, and reliability is not degraded. Therefore, compared to a conventional brush holder formed of only resin, thermal expansion is small, and clearances between brush box assemblies 40 and brushes 41 are designed to be small, and therefore reduction in sound and vibration is effective.

Furthermore, in this exemplary embodiment, gap sections 34s are provided around brush box assemblies 40, and therefore gap sections 34s function as heat insulating layers that allows heat to be unlikely to transfer, and resin sections in the vicinity of box fixing sections 34 can be protected from retention of high temperature heat. Furthermore, as described above, brushes 41 that reach a high temperature, and the resin walls in the vicinity of box fixing sections 34 can prevented from being fixed to each other. Additionally, gap sections 34s each have a structure in which air easily flows, so that it is possible to improve heat radiation of brushes 41 and brush box assemblies 40. Furthermore, in order to promote heat radiation, cost can be reduced by reduction in a grade of resin forming brush holder 31 (using of resin having low heat-resisting property).

The present invention is useful for a commutator motor with a brush for a vehicle.

The invention claimed is:

1. A brush holder assembly comprising:
    a brush holder formed in a disk shape by molding of insulating resin, and including a pair of box fixing sections each including a groove formed from an outer peripheral side toward inside; and
    brush box assemblies each having a brush box which houses a brush therein, each of the brush box assemblies being disposed in the groove in the box fixing section,
    wherein
    the brush box assembly is formed of box-like metal, and has a plurality of mounting legs,
    each of the box fixing sections of the brush holder has a pair of fixing wall sections, the groove formed to be sandwiched between the fixing wall sections, and a plurality of mounting holes, and
    the mounting legs are inserted into the respective mounting holes, and the brush box assemblies are fixed,
    wherein
    each of the brush box assemblies comprises:
        the brush;
        a brush spring for pressing the brush;
        a metal cover plate formed with the plurality of mounting legs and disposed on one side surface of a sliding section of the brush, and covering the groove of the box fixing section; and
        a metal brush case having a U-shaped cross-section, and housing the brush,
    wherein
    the metal brush case has three surfaces including:
        a bottom surface facing the groove and having two ends; and
        two side surfaces, the two side surfaces extending from the two ends of the bottom surface respectively and facing the fixing wall sections,
    the metal brush case of each of the brush box assemblies faces the brush holder through gaps in a noncontact manner so that an entirety of each surface of the three surfaces of the metal brush case does not contact any part of the brush holder.

2. The brush holder assembly according to claim 1, wherein a passage groove for a pigtail of the brush is formed on a side surface of one of the fixing wall sections of each of the box fixing sections.

3. A commutator motor comprising:
    a rotor that has a rotary shaft and a commutator, and rotates the rotary shaft around a rotation center;
    a frame that holds a stator, and holds the rotor therein; and
    the brush holder assembly according to claim 2, the brush holder assembly being disposed on a side of an opening of the frame.

4. The brush holder assembly according to claim 1, wherein the cover plate and the brush case are integrally formed by a plurality of caulking sections.

5. A commutator motor comprising:
    a rotor that has a rotary shaft and a commutator, and rotates the rotary shaft around a rotation center;
    a frame that holds a stator, and holds the rotor therein; and
    the brush holder assembly according to claim 4, the brush holder assembly being disposed on a side of an opening of the frame.

6. A commutator motor comprising:
    a rotor that has a rotary shaft and a commutator, and rotates the rotary shaft around a rotation center;
    a frame that holds a stator, and holds the rotor therein; and
    the brush holder assembly according to claim 1, the brush holder assembly being disposed on a side of an opening of the frame.

* * * * *